(12) United States Patent
Syed et al.

(10) Patent No.: US 11,619,190 B2
(45) Date of Patent: Apr. 4, 2023

(54) METHODS AND SYSTEM FOR ESTIMATING ENGINE TORQUE AT LOW TEMPERATURES

(71) Applicant: Ford Global Technologies, LLC, Dearborn, MI (US)

(72) Inventors: Fazal Urrahman Syed, Canton, MI (US); Timothy Baxendale, Royal Oak, MI (US); Thomas Ciccone, West Bloomfield, MI (US); Sassan Farahmand, Canton, MI (US); Kelly Johnson, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 149 days.

(21) Appl. No.: 16/983,239

(22) Filed: Aug. 3, 2020

(65) Prior Publication Data

US 2022/0034274 A1 Feb. 3, 2022

(51) Int. Cl.
| | |
|---|---|
| *F02D 41/14* | (2006.01) |
| *G01M 15/05* | (2006.01) |
| *G05B 19/406* | (2006.01) |
| *F02D 41/18* | (2006.01) |
| *F02D 41/12* | (2006.01) |

(52) U.S. Cl.
CPC ......... *F02D 41/1497* (2013.01); *F02D 41/12* (2013.01); *F02D 41/187* (2013.01); *G01M 15/05* (2013.01); *G05B 19/406* (2013.01); *F02D 2200/1004* (2013.01); *F02D 2200/501* (2013.01); *F02D 2200/602* (2013.01); *G05B 2219/41379* (2013.01)

(58) Field of Classification Search
CPC .... F02D 41/1497; F02D 41/12; F02D 41/187; F02D 2200/1004; F02D 2200/501; F02D 2200/602; G01M 15/05; G05B 19/406; G05B 2219/41379
USPC .......................................................... 700/28
See application file for complete search history.

(56) References Cited

U.S. PATENT DOCUMENTS

| | | | | |
|---|---|---|---|---|
| 5,603,672 A | * | 2/1997 | Zhang ................... | B60W 10/06 477/121 |
| 2002/0117339 A1 | * | 8/2002 | Nakashima ........... | B60W 10/06 180/65.25 |
| 2007/0192015 A1 | * | 8/2007 | Konishi .............. | F02D 41/1497 73/114.11 |
| 2009/0229897 A1 | * | 9/2009 | Yutani ................... | B60W 10/06 180/65.265 |

(Continued)

FOREIGN PATENT DOCUMENTS

| | | |
|---|---|---|
| JP | 3797353 B2 | 7/2006 |
| KR | 20100063308 A | 6/2010 |

(Continued)

*Primary Examiner* — Logan M Kraft
*Assistant Examiner* — John D Bailey
(74) *Attorney, Agent, or Firm* — David Kelley; McCoy Russell LLP (57) ABSTRACT

A method and system for operating a vehicle that includes an integrated starter/generator and a driveline disconnect clutch is described. In one example, the method estimates engine torque as a function of engine temperature during cold engine starts so that if an estimate of engine torque is in error, the integrated starter/generator may still successfully start the engine.

16 Claims, 6 Drawing Sheets

(56) References Cited

U.S. PATENT DOCUMENTS

| | | | | |
|---|---|---|---|---|
| 2010/0082188 A1* | 4/2010 | Ando | ............... | B60L 50/16 |
| | | | | 180/65.265 |
| 2011/0100013 A1* | 5/2011 | Whitney | ............ | F02D 41/1497 |
| | | | | 123/332 |
| 2011/0178690 A1* | 7/2011 | Fukumura | ............ | B60K 6/365 |
| | | | | 903/902 |
| 2011/0238280 A1* | 9/2011 | Shibata | ............ | F02D 41/3035 |
| | | | | 123/295 |
| 2012/0277946 A1* | 11/2012 | Yamamoto | ............ | B60W 20/10 |
| | | | | 180/65.265 |
| 2013/0041535 A1* | 2/2013 | Choi | ............ | B60W 20/00 |
| | | | | 180/65.265 |
| 2013/0103239 A1* | 4/2013 | Kamijo | ............ | B60W 20/00 |
| | | | | 180/65.265 |
| 2014/0074373 A1* | 3/2014 | Livshiz | ............ | F02P 5/1504 |
| | | | | 701/102 |
| 2014/0076279 A1* | 3/2014 | Livshiz | ............ | F02D 13/0219 |
| | | | | 123/403 |
| 2014/0121871 A1* | 5/2014 | Kim | ............ | B60W 10/06 |
| | | | | 180/65.265 |
| 2021/0107451 A1* | 4/2021 | Nose | ............ | B60W 10/06 |

FOREIGN PATENT DOCUMENTS

| | | |
|---|---|---|
| KR | 20190046323 A | 5/2019 |
| KR | 20190070509 A | 6/2019 |

\* cited by examiner

METHODS AND SYSTEM FOR ESTIMATING ENGINE TORQUE AT LOW TEMPERATURES

FIELD

The present description relates to methods and a system for estimating engine torque at during engine starting at low ambient temperatures. The methods and systems may be suitable for vehicles that include an integrated starter/generator.

BACKGROUND AND SUMMARY

An engine of a vehicle may be started at low temperatures. In some powertrains, the engine may be started via one of a plurality of engine starting devices. For example, the engine may be started via a starter that engages a flywheel, a belt integrated starter/generator (BISG), or an integrated starter/generator (ISG). Depending on vehicle operating conditions, the engine may be started via one of the starting devices that is selected from the three starting devices. However, if ambient temperature is less than a threshold temperature (e.g., −20° C.), then the engine may be started only via the ISG. The ISG may rotate the engine and control engine speed during engine starting. Torque of the ISG may be controlled during engine starting based on estimated engine torque in an effort to reduce engine speed error. In particular, the ISG may generate a negative torque to compensate for the positive torque that the engine is generating, thereby regulating the engine speed. However, at low ambient temperatures, open loop engine torque estimates may not be as accurate as may be desired. In particular, engine torque estimates may be greater than desired, which may result in an increase in ISG torque output to compensate for the estimated ISG torque. Since the torque that is generated by the ISG may be greater than the actual torque that is being generated by the engine, the engine speed may be reduced near zero such that the engine may not start as intended. Therefore, it may be desirable to improve the engine torque estimate to improve engine starting robustness.

The inventors herein have recognized the above-mentioned issues and have developed a method for operating a driveline, comprising: estimating engine torque based on engine speed and engine air flow via a controller; adjusting torque of an electric machine in response to the estimated engine torque during a first condition; and adjusting torque of the electric machine in response to a fraction of the estimated engine torque during a second condition.

By adjusting torque of an electric machine in response to an estimated torque during a first condition and by a fraction of the estimated torque during a second condition, it may be possible to reduce the possibility of an engine not starting. In particular, during conditions when engine temperature is greater than a threshold temperature, electric machine torque may be adjusted in response to a single or sole estimated engine torque that is based on engine speed and engine air flow. During conditions when engine temperature is less than the threshold temperature, electric machine torque may be adjusted in response to a fraction of the estimated engine torque so that if estimated engine torque is greater than actual engine torque, the electric machine may not stop engine rotation. Consequently, the engine may be rotated at a speed where combustion in the engine may be facilitated.

The present description may provide several advantages. Specifically, the approach may improve reliability of engine starting. Further, the approach may provide improved engine speed control during engine starting. In addition, the approach may reduce engine emissions via reducing the possibility of engine stalls.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
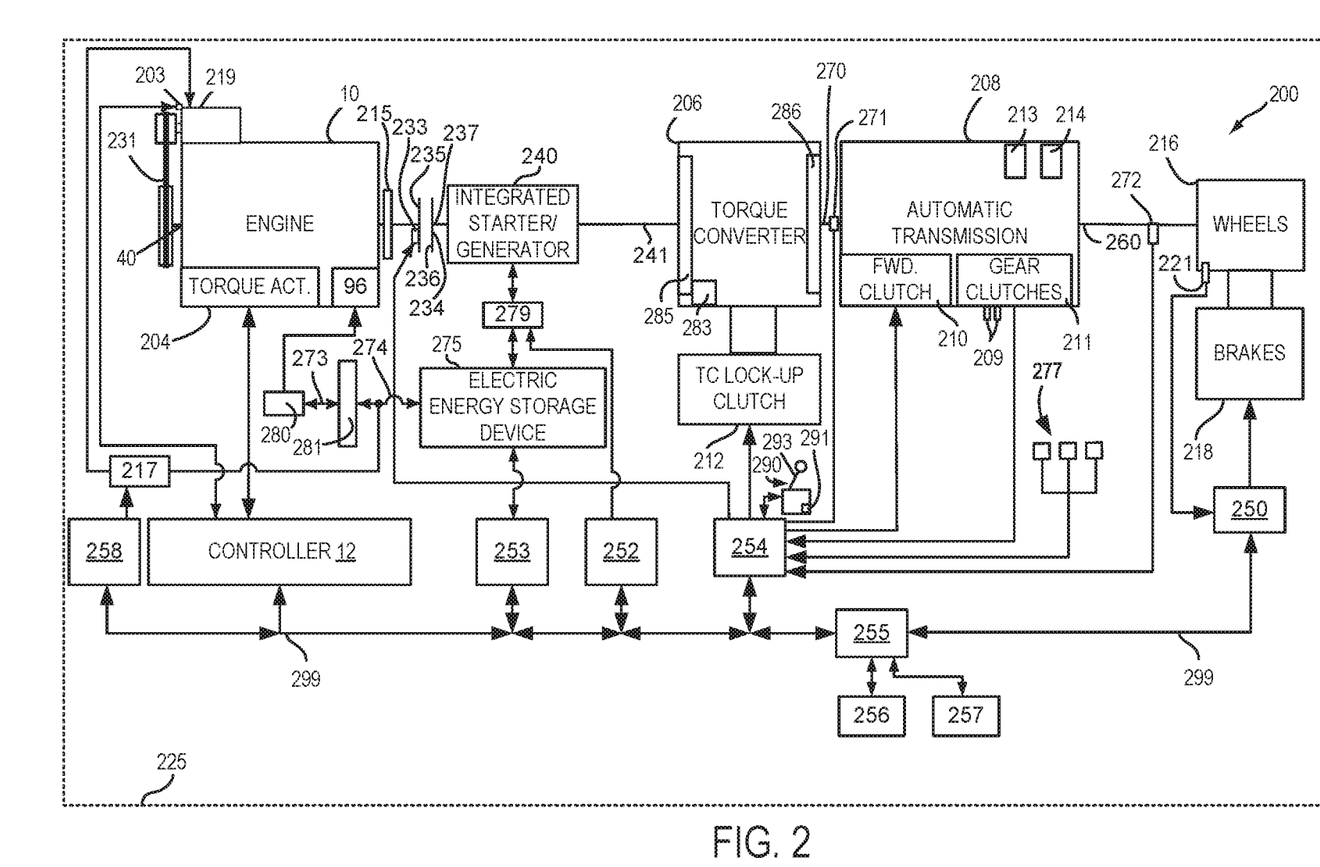
FIG. 2 shows a schematic diagram of an example vehicle driveline or powertrain including the internal combustion engine shown in FIG. 1.
Figure 3:
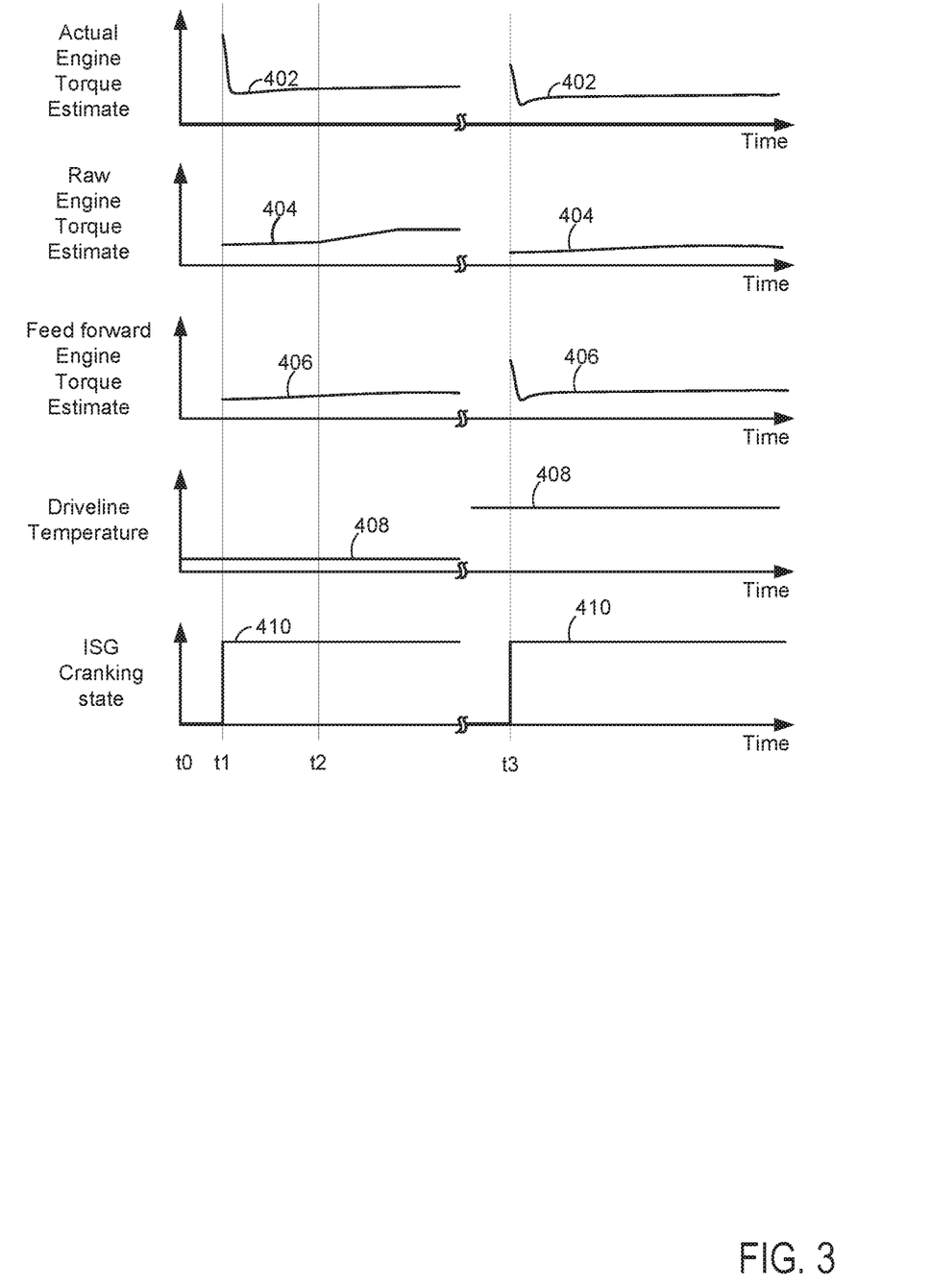
FIG. 3 shows an example plots of engine starting sequences according to the present description.
Figure 4A:
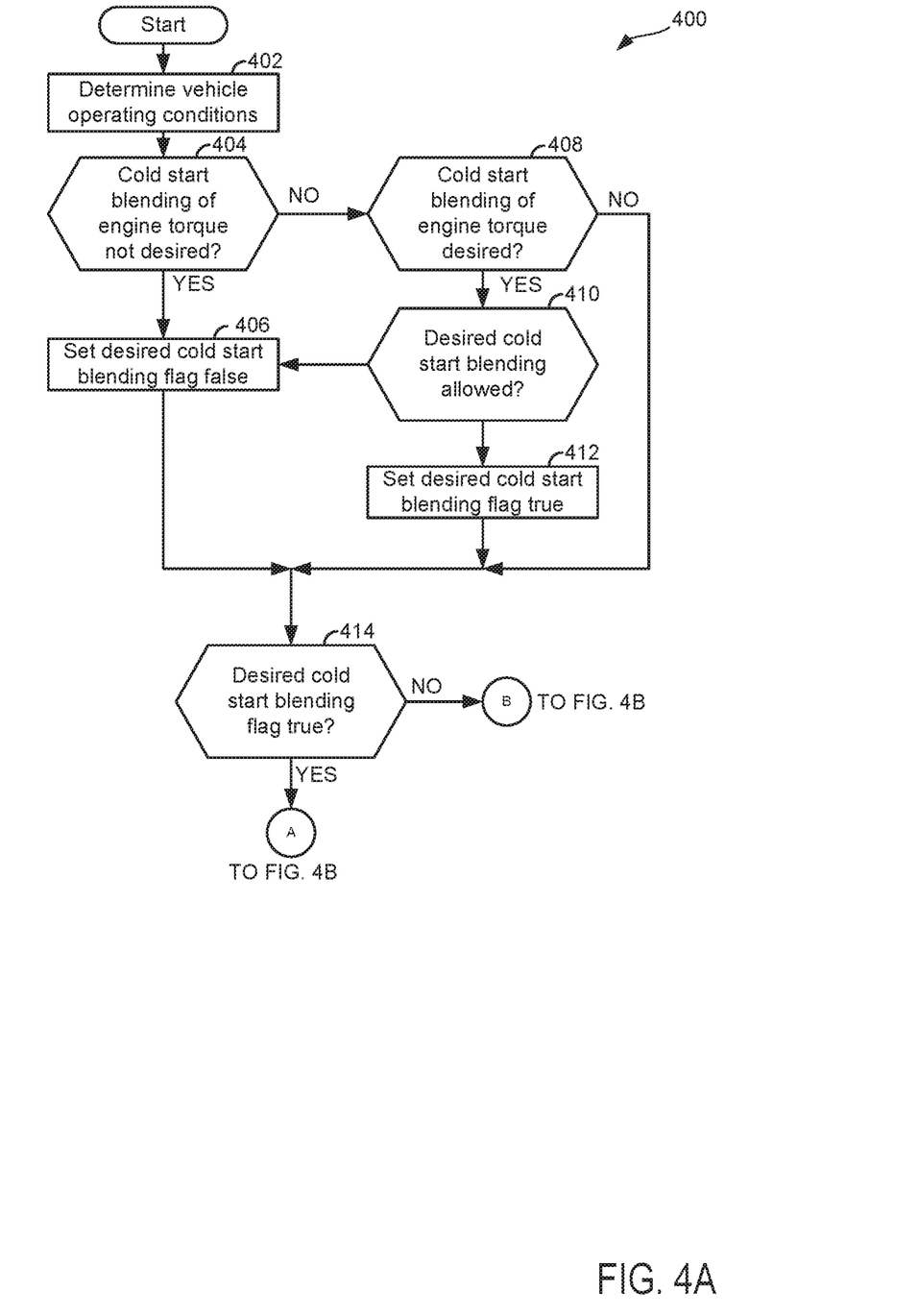
FIGS. 4A and 4B show an example method for operating a driveline of a vehicle.
Figure 4B:
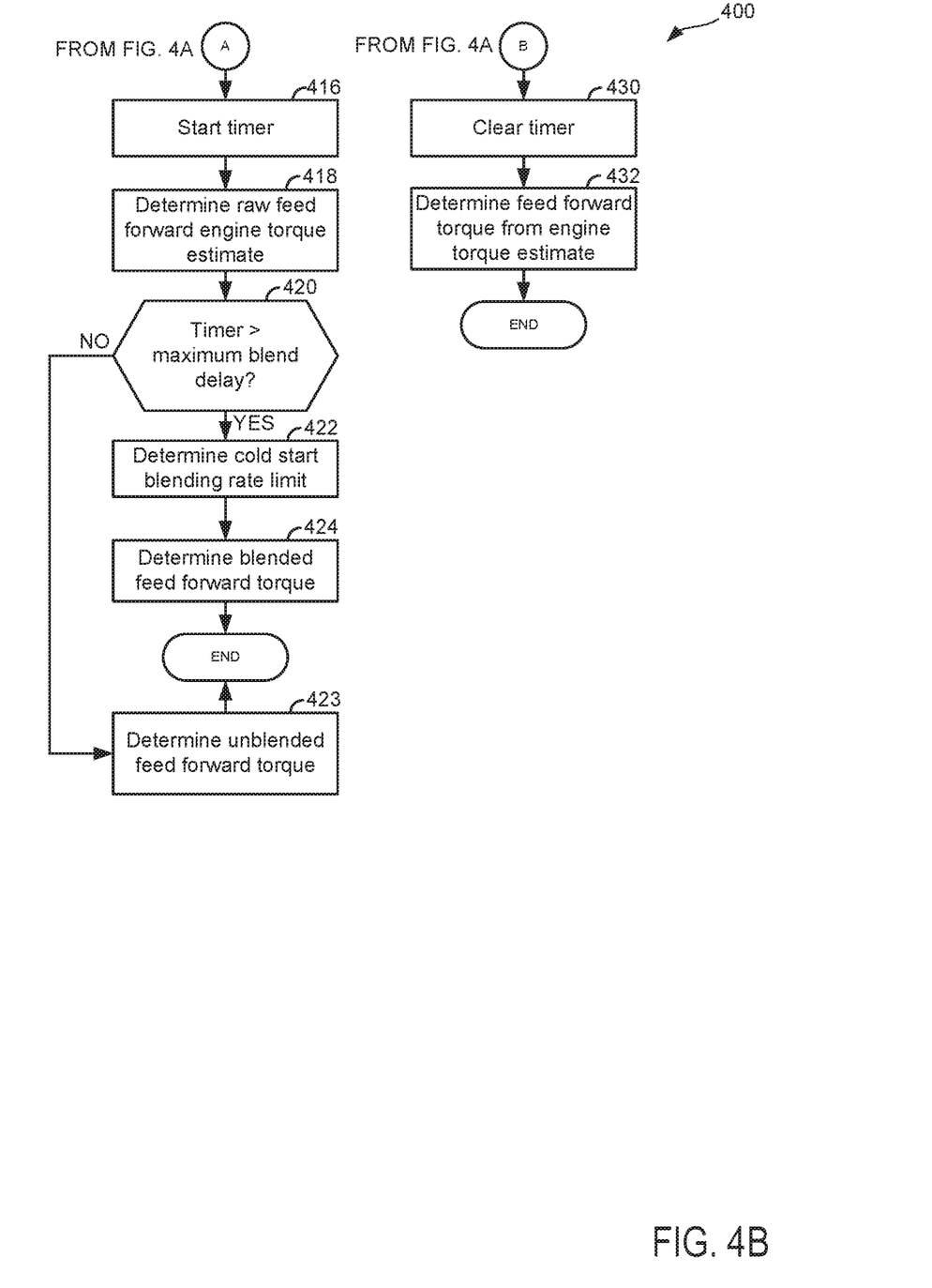
Figure 5:
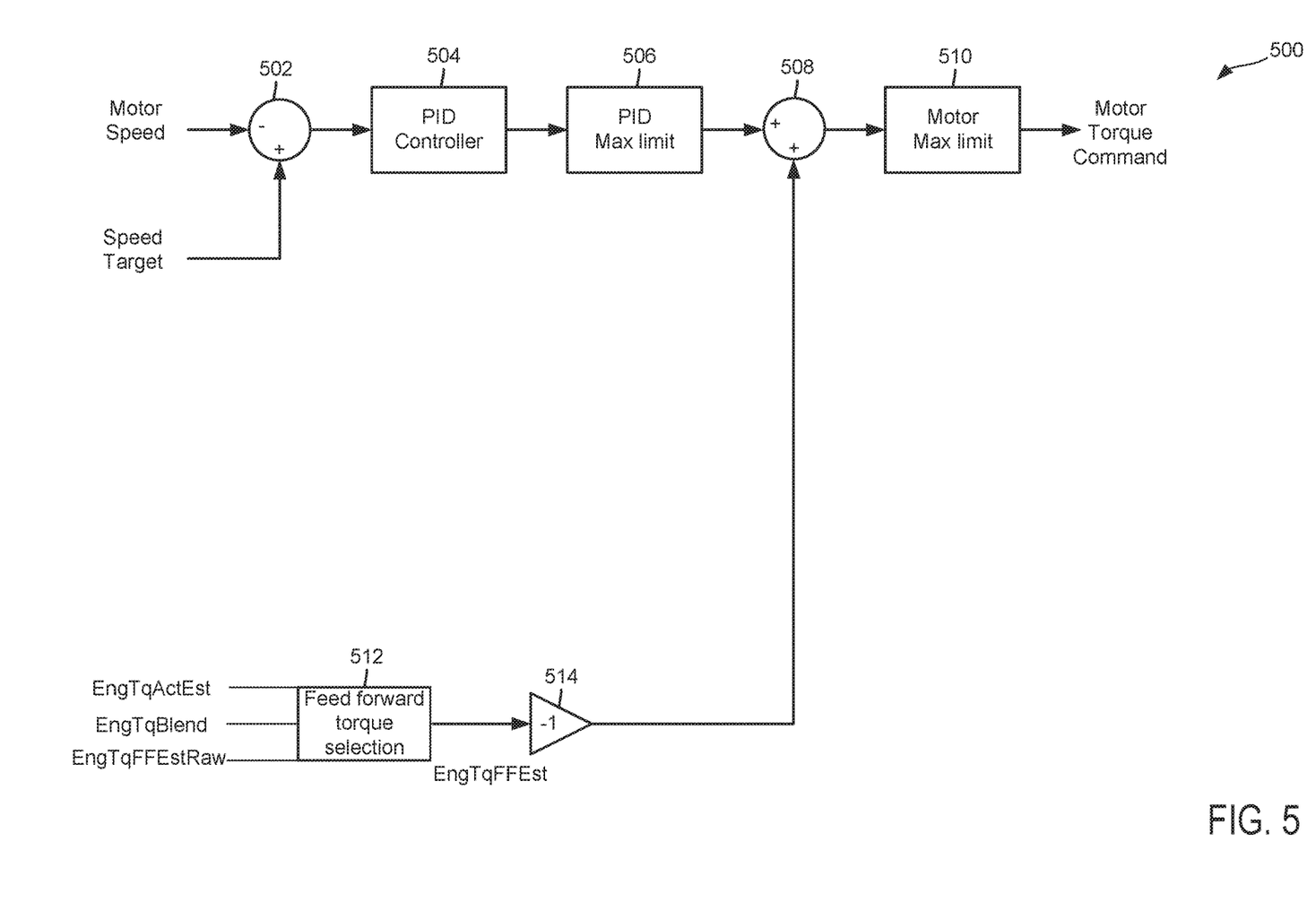
FIG. 5 shows a block diagram of a motor torque controller.

The present description is related to improving starting of an internal combustion engine at low ambient temperatures. The engine that is being cold started may be applied to an engine of the type shown in FIG. 1. The engine may be included in a driveline as shown in FIG. 2. The driveline may include more than one engine starting devices. At low ambient temperatures, the engine may be started via an integrated starter/generator (ISG). Example engine starting sequences are shown in FIG. 3. A method for operating a driveline and starting an engine is shown in FIGS. 4A and 4B. An example electric machine torque control block diagram is shown in FIG. 5.

Figure 1:
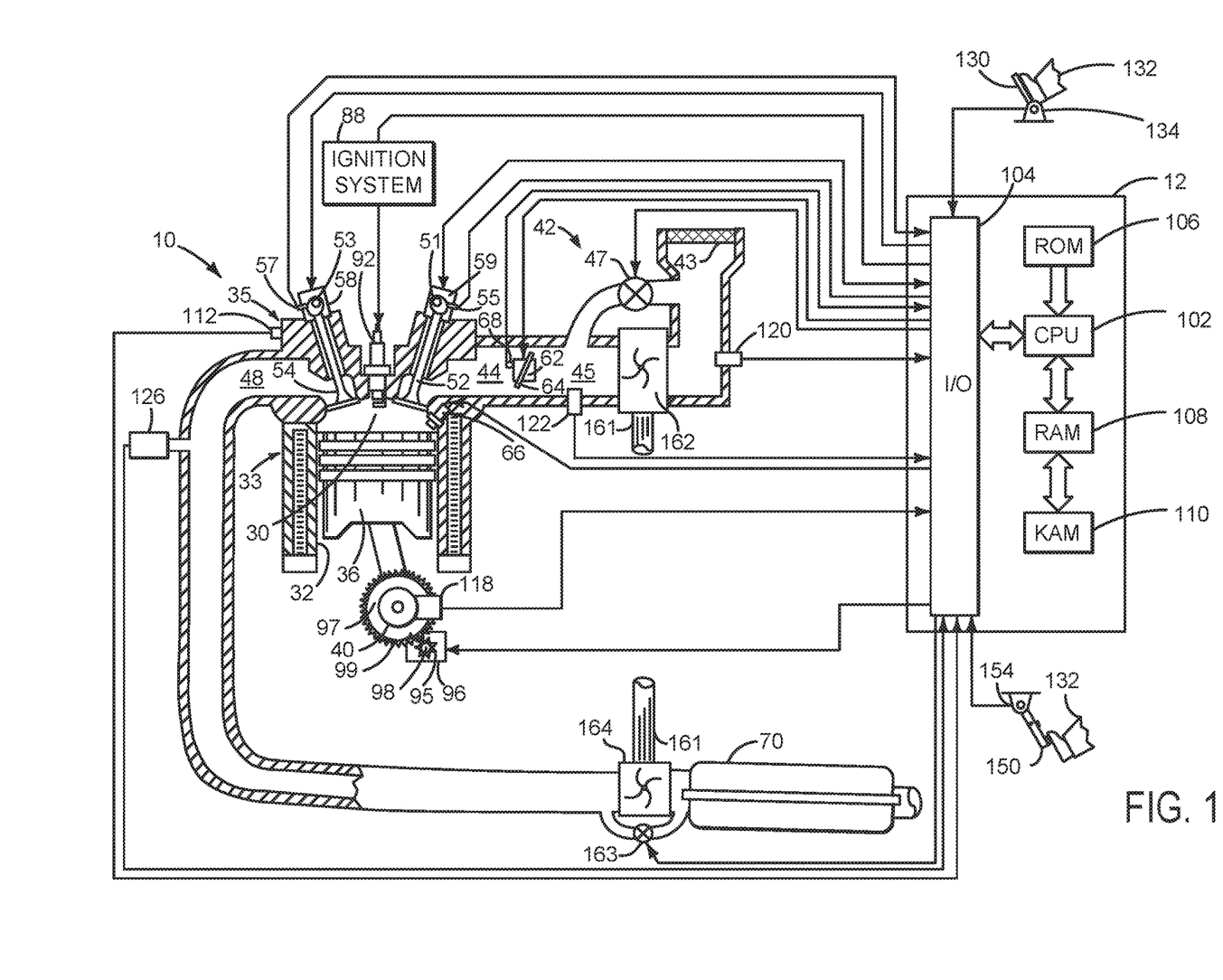
FIG. 1 shows a schematic diagram of an internal combustion engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 20 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A lift amount and/or a phase or position of intake valve 52 may be adjusted relative to a position of crankshaft 40 via valve adjustment device 59. A lift amount and/or a phase or position of exhaust valve 54 may be adjusted relative to a position of crankshaft 40 via valve adjustment device 58. Valve adjustment devices 58 and 59 may be electro-mechanical devices, hydraulic devices, or mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104 (e.g., including analog to digital converters, digital inputs, digital outputs, pulse width outputs, radio frequency inputs, radio frequency outputs, etc.), read-only memory 106 (e.g., non-transitory memory), random access memory 108, keep alive memory 110, and a conventional data bus. Controller 12 is shown receiving various signals from sensors coupled to engine 10, in addition to those signals previously discussed, including: cylinder head temperature from temperature sensor 112 coupled to cylinder head 35; a position sensor 134 coupled to an propulsion pedal 130 for sensing force applied by human foot 132; a position sensor 154 coupled to brake pedal 150 for sensing force applied by foot 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, BISG controller 258, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, BISG controller 258, transmission controller 254, and brake controller 250 to achieve driver input requests and other requests that are based on vehicle operating conditions.

For example, in response to a driver releasing a propulsion pedal and vehicle speed, vehicle system controller 255 may request a desired wheel power or a wheel power level to provide a desired rate of vehicle speed change. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In response to an engine starting request, BISG controller 258 may rotate command BISG 219 to rotate and start engine 10. Likewise, electric machine controller 252 may rotate ISG 240 to rotate and start engine 10 while disconnect clutch 236 is closed to start engine 10. In addition, BISG controller 258 and electric machine controller 252 may output torque and speed of BISG 219 and ISG 240 to CAN 299 to be received by one or more of the other previously mentioned controllers during engine starting to provide feedback as to the operating states of these engine starting systems.

Vehicle controller 255 and/or engine controller 12 may also receive input from human/machine interface 256 and traffic conditions (e.g., traffic signal status, distance to objects, etc.) from sensors 257 (e.g., cameras, LIDAR, RADAR, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240 (e.g., ISG). In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG windings may be determined via BISG winding temperature sensor 203. Driveline ISG 240 (e.g., high voltage (operated with greater than 30 volts) electrical machine) may also be referred to as an electric machine, motor, and/or generator. Further, power of engine 10 may be adjusted via torque actuator 204, such as a fuel injector, throttle, etc.

BISG 219 is mechanically coupled to engine 10 via belt 231 and BISG 219 may be referred to as an electric machine, motor, or generator. BISG 219 may be coupled to crankshaft 40 or a camshaft (e.g., 51 or 53 of FIG. 1). BISG 219 may operate as a motor when supplied with electrical power via high voltage bus 274 via inverter 217. Inverter 217 converts direct current (DC) power from high voltage bus 274 to alternating current (AC) and vice-versa so that power may be exchanged between BISG 219 and electric energy storage device 275. Thus, BISG 219 may operate as a generator supplying electrical power to high voltage electric energy storage device (e.g., battery) 275 and/or low voltage bus 273. Bi-directional DC/DC converter 281 may transfer electrical energy from a high voltage bus 274 to a low voltage bus 273 or vice-versa. Low voltage battery 280 is electrically directly coupled to low voltage bus 273. Low voltage bus 273 may be comprised of one or more electrical conductors. Electric energy storage device 275 is electrically coupled to high voltage bus 274. Low voltage battery 280 may selectively supply electrical energy to starter motor 96.

An engine output power may be transmitted to a first or upstream side of powertrain disconnect clutch 235 through dual mass flywheel 215. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275 via inverter 279. Inverter 279 may convert direct current (DC) electric power from electric energy storage device 275 into alternating current (AC) electric power for operating ISG 240. Alternatively, inverter 279 may convert AC power from ISG 240 into DC power for storing in electric energy storage device 275. Inverter 279 may be controlled via electric machine controller 252. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC 212 is locked. TCC 212 is electrically operated by controller 254. Alternatively, TCC may be hydraulically locked. In one example, the torque converter 206 may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be transferred to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information.

In response to a request to increase speed of vehicle 225, vehicle system controller may obtain a driver demand power or power request from an propulsion pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel torque limit of 50 N-m, ISG power is adjusted to provide less than 50 N-m (e.g., 49 N-m) of negative torque at the wheels, including compensating for transmission gearing.

The system of FIGS. 1 and 2 provides for a vehicle system, comprising: an internal combustion engine; an electric machine; and a controller including executable instructions stored in non-transitory memory that cause the controller to adjust torque of the electric machine in response to a first engine torque estimation value and a second engine torque estimation value, where the first engine torque estimation value is generated via a first source and where the second engine torque estimation value is generated via a second source. The vehicle system includes where the first engine torque estimation value is generated based on engine speed and engine air flow. The vehicle system includes where the second engine torque estimation value is generated not based on engine speed and engine air flow. The vehicle system further comprises additional instructions to multiply the second engine torque estimation value and a weighting factor that is a function of time. The vehicle system further comprises additional instructions to multiply the first engine torque estimation value and a value of one minus the weighting factor. The vehicle system further comprises additional instructions to adjust torque of the electric machine in response to an electric machine speed error. The vehicle system further comprises additional instructions to apply a proportional/integral controller to the electric machine speed error.

Referring now to FIG. 3, an example vehicle operating sequence is shown. In particular, two separate engine starts are shown. The sequence of FIG. 3 may be generated via the system of FIGS. 1 and 2 in cooperation with the method of FIGS. 4A and 4B. Vertical lines at times t0-t3 represent times of interest during the sequence. The plots in FIG. 3 are time aligned and occur at the same time. The SS marks along each of the horizontal axes represent breaks in time that may be short or long in duration.

The first plot from the top of FIG. 3 is a plot of an actual engine torque estimate that is based on engine air flow (e.g., an amount of air flowing into the engine) and engine speed versus time. The vertical axis represents the actual engine torque estimate and the actual torque estimate increases in the direction of the vertical axis arrow. The horizontal axis represents time and the amount of time increases from the left side of the plot to the right side of the plot. Trace 402 represents the actual engine torque estimate.

The second plot from the top of FIG. 3 is a plot of a raw engine torque estimate that is based on an engine temperature and the actual engine torque estimate versus time. The vertical axis represents the raw engine torque estimate and the raw torque estimate increases in the direction of the vertical axis arrow. The horizontal axis represents time and the amount of time increases from the left side of the plot to the right side of the plot. Trace 404 represents the raw engine torque estimate.

The third plot from the top of FIG. 3 is a plot of a feedforward engine torque estimate versus time. The vertical axis represents the feedforward engine torque estimate and the feedforward estimate increases in the direction of the vertical axis arrow. The horizontal axis represents time and the amount of time increases from the left side of the plot to the right side of the plot. Trace 406 represents the feedforward engine torque estimate.

The fourth plot from the top of FIG. 3 is a plot of a driveline temperature (e.g., engine coolant temperature, engine oil temperature, transmission oil temperature, etc.) versus time. The vertical axis represents the driveline temperature and the driveline temperature increases in the direction of the vertical axis arrow. Trace 408 represents the driveline temperature. The horizontal axis represents time and time increases from the left side of the plot to the right side of the plot.

The fifth plot from the top of FIG. 3 is a plot of an ISG state versus time. The vertical axis represents the ISG state and the ISG is activated when trace 410 is at a higher level near the vertical axis arrow. The ISG is not activated when trace 410 is at a lower level near the horizontal axis. Trace 410 represents the ISG engine cranking state. The horizontal axis represents time and time increases from the left side of the plot to the right side of the plot.

At time t0, the engine is not running and the engine is not generating torque. The actual engine torque and raw engine torques are not determined. The feedforward engine torque is not determined. The driveline temperature is low and the ISG is not cranking the engine.

At time t1, an engine cold start is requested as indicated by the ISG state changing to being asserted. The actual engine torque estimate is high since the engine's cylinders are filled with air. The raw engine torque estimate is lower than the actual engine torque estimate and the feedforward engine torque estimate is close to the raw engine torque estimate. The feedforward torque estimate is more heavily weighted toward the raw engine torque estimate than toward the actual engine torque estimate because the actual engine torque estimate may not be as accurate as may be desired. The electric motor torque (not shown) is corrected based on the feedforward engine torque estimate.

Between time t1 and time t2 the feedforward engine torque continues to be weighted toward the raw engine torque estimate. The raw engine torque estimate increases a small amount and the actual engine torque amount is reduced. The driveline temperature is unchanged and the ISG is activated to assist the engine reaching idle speed and controlling engine speed.

At time t2, a threshold amount of time has pass since the engine cold start was requested. The feedforward engine torque is ramped to the actual engine torque estimate after the threshold amount of time is exceeded. The driveline temperature remains low and the ISG remains activated. A break in the sequence occurs after time t2.

After time t2 and before time t3, the engine is not running and the engine is not generating torque. The actual engine torque and raw engine torques are not determined. The feedforward engine torque is not determined. The driveline temperature is low and the ISG is not cranking the engine.

At time t3, an engine warm start is requested as indicated by the ISG state changing to being asserted. The actual engine torque estimate is higher, but lower than at time t1, since the engine's cylinders are filled with air. The raw engine torque estimate is lower than the actual engine torque estimate and the feedforward engine torque estimate is close to the actual engine torque estimate. The feedforward torque estimate is more heavily weighted toward the actual engine torque estimate than toward the raw engine torque estimate because the actual engine torque estimate may be more accurate at higher driveline temperatures. The electric motor torque (not shown) is corrected based on the feedforward engine torque estimate.

In this way, the feedforward engine torque estimate may be adjusted as a function of a driveline temperature so engine torque estimates at lower driveline temperatures may be improved. The feedforward engine torque estimate may then be applied as a basis for adjusting ISG torque. Since the engine torque estimate at lower engine temperatures is lower, negative torque generated via the ISG to counteract engine torque may be reduced so that the engine may accelerate to idle speed without being stopped.

Referring now to FIGS. 4A and 4B, an example method for operating a vehicle that includes an ISG that may be applied to start an engine at lower driveline temperatures is shown. The method of FIGS. 4A and 4B may be incorporated into and may cooperate with the system of FIGS. 1 and 2 and the torque controller shown in FIG. 5. Further, at least portions of the method of FIGS. 4A and 4B may be incorporated as executable instructions stored in non-transitory memory while other portions of the method may be performed via a controller transforming operating states of devices and actuators in the physical world. The method of FIGS. 4A and 4B may be executed in response to a cold engine start request where the driveline disconnect clutch is fully closed and the ISG rotates the engine to start the engine.

At 402, method 400 determines vehicle operating conditions. Vehicle operating conditions may include but are not limited to vehicle speed, propulsion pedal position, brake pedal position, state of battery charge, transmission oil temperature, engine oil temperature, engine coolant temperature, and driver demand torque. Method 400 proceeds to 404.

At 404, method 400 judges if an engine cold start blending of engine torque estimates is not desired. In one example, method 400 may determine that an engine cold start blending of engine torque estimates is not desired if the following conditions are met: engine speed is above a blending speed threshold (kTqBlendOffSpeed) OR when engine speed is less than a blend-on speed threshold (kTqBlendOnSpeed) OR when transmission temperature is greater than a blend-off temperature (kTqBlendOffTemp) OR if a transmission gear is not in park AND not in neutral. The before mentioned logic may be expressed as: (Engine speed>=kTqBlendOffSpeed) OR (Engine speed<=kTqBlendOnSpeed) OR (Trans Temp.>=kTBlend OffTemp) OR (Gear !=Park AND Gear !=Neutral), where "!=" is not equal, OR is logical or, AND is logical and, and where the other parameters are as previously described. If method 400 judges that the conditions are present, the answer is yes and method 400 proceeds to 406. Otherwise, the answer is no and method 400 proceeds to 408.

At 406, method 400 sets a variable bColdStrtBlendEstFF to false. The variable bColdStrtBlendEstFF is set false so that cold engine start feed forward engine torque blending is not provided. The variable bColdStrtBlendEstFF is an engine cold start torque bending flag variable that indicates whether or not engine cold start torque blending is activated or not activated. Method 400 proceeds to 414.

At 408, method 400 judges if an engine cold start blending of engine torque estimates is desired. In one example, method 400 may determine that an engine cold start blending of engine torque estimates is desired if the following conditions are met: powertrain state is equal to disconnect clutch cranking engine AND torque converter impeller speed minus engine speed is less than a speed difference threshold AND engine speed is less than a blending speed threshold (kTqBlendOffSpeed) AND when engine speed is greater than a blend-on speed threshold (kTqBlendOnSpeed) AND when transmission temperature is less than a blend-off temperature (kTqBlendOffTemp) AND if a transmission gear is in park OR in neutral. The before mentioned logic may be expressed as: (Powertrain state=disconnect clutch cranking) AND ((Impeller Speed engine speed)<kMtrEngDIff) AND (Engine speed<kTqBlendOffSpeed) AND (Engine speed>kTqBlendOnSpeed) AND (Trans Temp.<kTBlend OffTemp) AND (Gear=Park OR Gear=Neutral), where the other parameters are as previously described. If method 400 judges that the conditions are present, the answer is yes and method 400 proceeds to 410. Otherwise, the answer is no and method 400 proceeds to 414.

At 410, method 400 judges if cold start engine torque blending is allowed. Method 400 may determine if cold start engine torque blending is allowed based on a value or state of a calibration in controller memory. In one example, method judges if a variable bColdStrtBlendEstFFDesired is true, if so the answer is yes and method 400 proceeds to 412. Otherwise, the answer is no and method 400 proceeds to 406.

At 412, method 400 sets a variable bColdStrtBlendEstFF to true. The variable bColdStrtBlendEstFF is set true so that cold start engine torque blending may be provided. Method 400 proceeds to 414.

At 414, method 400 judges if the cold start blending flag or variable bColdStartBlendEstFFDesired is true. If so, the answer is yes and method 400 proceeds to 416. Otherwise, the answer is no and method 400 proceeds to 430.

At 416, method 400 starts and increments a value of a timer that begins incrementally increasing from a value of zero in response to onset of a most recent engine cold start request in which the driveline disconnect clutch is closed and the ISG is rotating the engine. Method 400 proceeds to 418.

At 418, method 400 determines a raw feedforward engine torque estimate. In one example, the raw feedforward engine torque estimate may be determined via the following equation: EngTqFFEstRaw=f(ect)*w(T)+(1−W(T))*EngTqActEst, where EngTqFFEstRaw is the raw engine torque estimate, f is a function that returns an engine torque estimate that is based on an engine coolant temperature (ect), w is a function that returns a weighting value that is between 0 and 1 that is a function of time T accumulated in the timer of step 416, and EngTqActEst is an actual engine torque estimate that is based on air flow through the engine and engine speed. In one example, the actual engine torque estimate is output from a table that is indexed or referenced via the engine's air flow and engine speed. The estimate of the actual engine torque may be described as being from a first source (e.g., a table referenced via engine air flow and engine speed). The estimate of raw engine torque may be described as being from a second source (e.g., parameters including f(ect), weighting factor w, and EngTqActEst). Method 400 proceeds to 420.

At 420, method 400 judges if the value of the timer is greater than a maximum torque blending delay time, which may be expressed as: T>FFTqBlendMaxDly. If so, the answer is yes and method 400 proceeds to 422. Otherwise, the answer is no and method 400 proceeds to 423.

At 422, method 400 determines rate limited cold start torque blending value. In one example, the rate limited cold start torque blending value may be expressed via the following equation: bColdStrtBlendRatelimited=RateLimit (bColdStrtBlendEstFF, T-FFTqBlendMaxDly, tft), where RateLimit is a function that returns the engine cold start engine torque rate limiting value, bColdStrtBlendEstFF is the cold engine start torque blending flag variable, T is the value in the timer described at 416, and FFTqBlendMaxDly is the maximum torque blending delay time, and tft is transmission fluid temperature. Method 400 proceeds to 424.

At 424, method 400 adjusts the feedforward engine torque estimate to a blend of the raw engine estimated engine torque (EngTqFFEstRaw) and the actual engine torque estimate (EngTqActEst). In one example, the feedforward engine torque may be determined via the following equation: EngTqFFEst=(bColdStartBlendRatelimited*EngTqActEst)+(1−bColdStartBlendRatelimited)*EngTqActEstRaw. Method 400 outputs the feedforward torque estimate to the driveline control system.

At 423, method 400 adjusts the feedforward engine torque estimate to the raw engine estimated engine torque (EngTqFFEstRaw) via the following equation: EngTqFFEst=EngTqFFEstRaw. Method 400 outputs the feedforward torque estimate to the driveline control system.

At 430, method 400 clears the timer described at 416 to a value of zero. Method 400 proceeds to 432.

At 432, method 400 method 400 adjusts the feedforward engine torque estimate to the actual engine estimated engine torque (EngTqActEst) via the following equation: EngTqFFEst=EngTqActEst. Method 400 outputs the feedforward torque estimate to the driveline control system.

In this way, engine feedforward torque estimates may be generated via different sources based on vehicle operating conditions. The engine feedforward torque estimates may be distributed throughout the driveline system so that driveline torque may be controlled.

Referring now to FIG. 5, a block diagram for controlling torque of an ISG is shown. Speed of the ISG and a desired or target ISG speed are input to summing junction 502. An ISG speed error (e.g., Desired ISG speed−actual ISG speed) is output from summing junction 502 and input to proportional/integral/derivative PID controller 504. The PID controller determines a proportional amount of the error by multiplying the error by a proportional gain. The PID controller determines an integral amount by integrating the integral of the ISG speed error multiplied by an integral gain. The PID controller determines a derivative amount by determining a derivative of the ISG speed error multiplied by a derivative gain. The proportional, integral, and derivative amounts are summed together and output via the PID controller to a PID limiting function 506. Output of the PID controller is constrained or limited to less than a threshold amount via PID limiting function 506. For example, if the PID limiting function limit is 100 and the PID controller outputs a value of 110, then 100 is output of PID limiting function 506. The output of PID limiting function 506 is input to summing junction 508.

A feedforward engine torque estimate is selected at 512. In one example, the feedforward engine torque estimate may be selected as described at steps 424-426 and 434. Block 512 outputs the engine feedforward engine torque estimate to block 514. Block 514 changes the sign of the engine feedforward engine torque estimate. For example, if the feedforward engine torque is 40 Newton meters (Nm), then the output of block 514 is −40 Nm. The output of block 514 is input to summing junction 508. Summing junction 508 adds output of the PID controller to output of block 514 and provides the result to block 510. Block 510 constrains the output of summing junction 508 (e.g., the ISG torque command), to less than a threshold value. The ISG is commanded to provide the torque value that is output via block 510.

In this way, the ISG torque may be a function of the feedforward engine torque estimate. The ISG torque controller shown in FIG. 5 may be activated during engine starting.

Thus, method 400 in cooperation with the torque control method of FIG. 5 provides for a method for operating a driveline, comprising: estimating engine torque based on engine speed and engine air flow via a controller; adjusting torque of an electric machine in response to the estimated engine torque during a first condition; and adjusting torque of the electric machine in response to a fraction of the estimated engine torque during a second condition. The method includes where the first condition is an engine temperature greater than a threshold temperature. The method includes where the second condition is the engine temperature less than the threshold temperature. The method further comprises adjusting torque of the electric machine in response to a torque that is a blend of the estimated engine torque and the fraction of the estimated engine torque.

In some examples, the method includes where torque of the electric machine is adjusted in response to the torque that is the blend of the estimated engine torque and the fraction of the estimated engine torque a predetermined amount of time since a most recent start of an engine. The method includes where the estimated engine torque is further based on spark timing. The method further comprises adjusting torque of the electric machine in response to an electric machine speed error. The method further comprises applying a proportional/integral controller to the electric machine speed error.

Method 400 in cooperation with the torque controller of FIG. 5 also provides for a method for operating a driveline, comprising: rotating an engine via closing a driveline disconnect clutch and rotating an electric machine in response to a request to start the engine; adjusting torque of the electric machine while rotating the engine in response to a speed error of the electric machine and an engine torque estimate that is not a function of engine air flow and engine speed. The method further comprises adjusting torque of the electric machine in further response to an engine torque estimate that is a function of engine air flow and speed. The method further comprises modifying the speed error via a proportional/integral controller. The method includes where the electric machine is an integrated starter/generator. The method includes wherein the engine torque estimate that is not a function of engine air flow and engine speed is a function of an engine temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a driveline, comprising:
   estimating engine torque based on engine speed and engine air flow via a controller;
   adjusting torque of an electric machine in response to the estimated engine torque during a first condition, where the first condition is an engine temperature greater than a threshold temperature; and
   adjusting torque of the electric machine in response to a fraction of the estimated engine torque during a second condition.

2. The method of claim 1, further comprising adjusting torque of the electric machine in response to a torque that is a blend of the estimated engine torque and the fraction of the estimated engine torque.

3. The method of claim 2, where torque of the electric machine is adjusted in response to the torque that is the blend of the estimated engine torque and the fraction of the estimated engine torque a predetermined amount of time since a most recent start of an engine.

4. The method of claim 1, further comprising adjusting torque of the electric machine in response to an electric machine speed error.

5. The method of claim 4, further comprising applying a proportional/integral controller to the electric machine speed error.

6. The method of claim 1, where the second condition is the engine temperature less than the threshold temperature.

7. The method of claim 1, where the estimated engine torque is further based on spark timing.

8. A vehicle system, comprising:
   an internal combustion engine;
   an electric machine; and
   a controller including executable instructions stored in non-transitory memory that cause the controller to adjust torque of the electric machine in response to a first engine torque estimation value and a second engine torque estimation value, where the first engine torque estimation value is generated based on engine speed and engine air flow and where the second engine torque estimation value is generated not based on engine speed and engine air flow, and additional instructions to multiply the second engine torque estimation value and a weighting factor that is a function of time.

9. The vehicle system of claim 8, further comprising additional instructions to adjust torque of the electric machine in response to an electric machine speed error.

10. The vehicle system of claim 9, further comprising additional instructions to apply a proportional/integral controller to the electric machine speed error.

11. The vehicle system of claim 8, further comprising additional instructions to multiply the first engine torque estimation value and a value of one minus the weighting factor.

12. A method for operating a driveline, comprising:
    rotating an engine via closing a driveline disconnect clutch and rotating an electric machine in response to a request to start the engine;
    adjusting torque of the electric machine while rotating the engine in response to a speed error of the electric machine and an engine torque estimate that is not a function of engine air flow and engine speed.

13. The method of claim 12, further comprising adjusting torque of the electric machine in further response to an engine torque estimate that is a function of engine air flow and speed.

14. The method of claim 13, further comprising modifying the speed error via a proportional/integral controller.

15. The method of claim 14, where the electric machine is an integrated starter/generator.

16. The method of claim 12, wherein the engine torque estimate that is not a function of engine air flow and engine speed is a function of an engine temperature.

* * * * *